March 25, 1952   D. M. LIGHT   2,590,714
BRAKE HANGER STABILIZER
Filed Nov. 16, 1949

INVENTOR.
David M. Light
BY
Atty

Patented Mar. 25, 1952

2,590,714

UNITED STATES PATENT OFFICE 2,590,714

BRAKE HANGER STABILIZER

David M. Light, Chicago, Ill., assignor to American Steel Foundries, Chicago, Ill., a corporation of New Jersey Application November 16, 1949, Serial No. 127,699

7 Claims. (Cl. 188—207)

This invention relates to railway brake equipment of the hanger suspended type and more particularly to novel means for controlling pendulous oscillations of the brake hangers and the rigging suspended thereby.

The principal object of the invention is to provide a control member between the hanger and its support wherein an effective, simple connection is employed between the hanger and the control arm whereby the control means are effective to yieldingly resist pendulous movements of the hanger in all directions.

A further object of the invention is to provide a novel connection between the hanger and control arm which permits adjustment of the control arm longitudinally of the hanger.

A further object of the invention is to provide a connection by means of which the arm and a hanger such as used in present equipment may be economically and quickly connected without weakening the hanger.

These and other objects of the invention will become more apparent from the specification and the drawing, wherein.

Figures 1, 2:
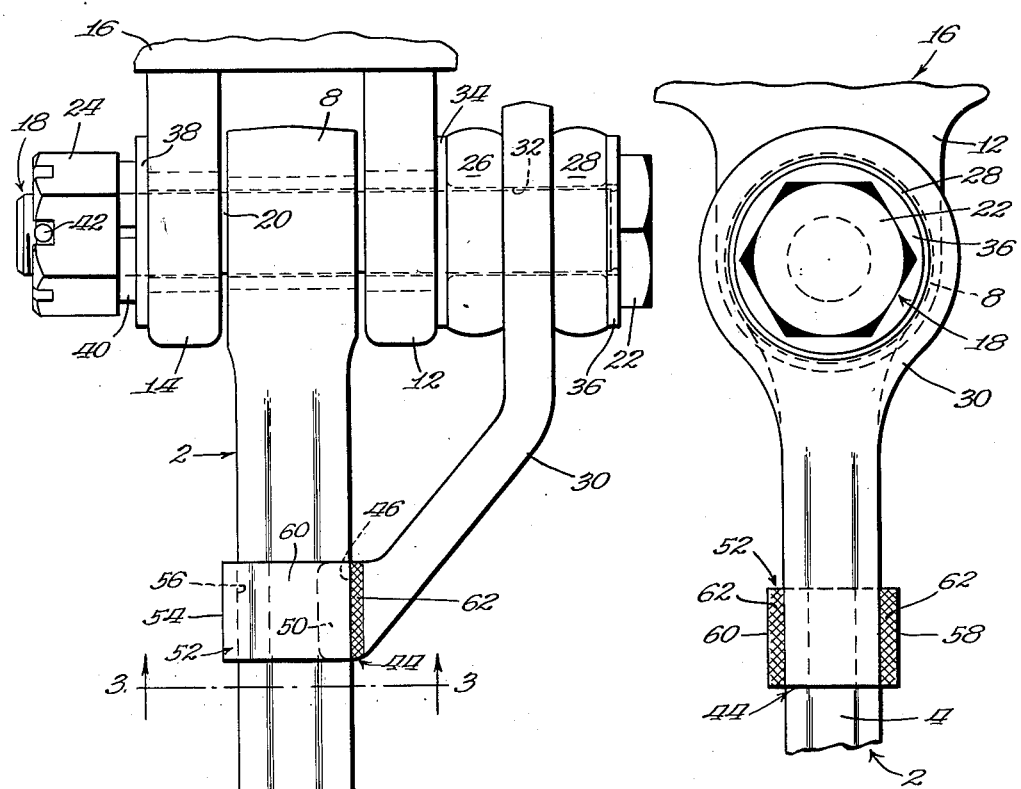
Figure 1 is a front view of a brake structure with the invention applied thereto.
Figure 2 is a fragmentary side elevational view of the arrangement shown in Figure 1, taken from the right thereof.
Figure 3:
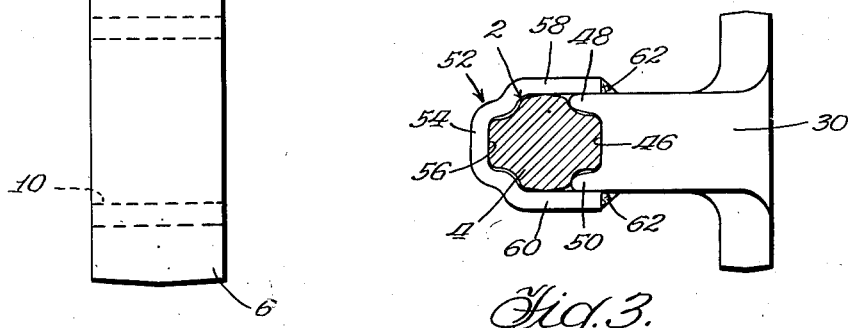
Figure 3 is a cross-sectional view taken substantially on the line 3—3 of Figure 1 and looking in the direction of the arrows.

Describing the invention in detail, the brake hanger, generally designated 2, may be of conventional form comprising a shank or body portion 4 intermediate its ends of cruciform cross section and heads 6 and 8 at opposite ends thereof. The head 6, located at the lower end of the hanger, is provided with a bushed opening 10 affording the usual means of connection to an associated brake part, such as a brake beam (not shown).

The head 8 at the upper end of the hanger is received between a pair of spaced substantially parallel lugs 12 and 14 of a support bracket 16 which may be an integral part of an associated truck frame (not shown) as will be readily understood by those skilled in the art.

The hanger is pivotally connected to the bracket by a bolt and nut assembly, generally designated 18, the bolt comprising a shank 20 which extends through aligned bushed openings in the head 8 of the hanger and in the bracket lugs 12 and 14. The ends of the shank project outwardly beyond the remote sides of the lugs 12 and 14.

The bolt comprises a head 22 at one end of the shank spaced outwardly with respect to lug 12, and a nut 24 is threaded on the other end of the shank outwardly of lug 14.

A pair of doughnuts 26 and 28 formed of resilient material, preferably rubber, are sleeved on the shank between the head 22 and the external side of the lug 12.

The upper end of a control arm, generally designated 30, is provided with an opening 32 accommodating the shank 20 loosely therethrough, the upper end of said arm being interposed between the doughnuts 26 and 28 in engagement therewith. A washer 34 is interposed between the doughnut 26 and the outer face of lug 12 and a similar washer 36 is sleeved on the shank between the head 22 and the doughnut 28. Engaging washers 38 and 40 are sleeved on the opposite end of the shank between the nut 24 and the external side of lug 14, washer 38 engaging lug 14 and lock washer 40 engaging nut 24. It will be understood that tightening of nut 24 will compress the doughnuts against the opposite sides of the upper end of the control arm 30. The nut may preferably be provided with castellations within which may be received a cotter key (not shown) which may extend through an opening 42 in the shank in order to prevent disassembly of the nut with respect to the shank.

The control arm is angled intermediate its ends toward the hanger and is provided at its lower end with a jaw 44 which embraces a portion of the shank. The inner end of the jaw engages one side of the shank as at 46 and the ends 48 and 50 of the jaw extend around the rear and front sides of the shank. The jaw 44 is telescoped into a U-shaped jaw member or clip 52 which surrounds the remaining sides of the shank. It will be noted that the jaw 44 and jaw member 52, when assembled, extend completely around the shank. The member 52 comprises a base portion 54 which engages as at 56 the side of the shank remote from the jaw 44, the base being connected at opposite ends to legs 58 and 60 which pass around and engage the rear and forward sides of the shank. The member 52 is contoured to the shape of the shank. The outer ends of the legs 58 and 60 receive the portions 48 and 50 of the jaw 44. The jaw 44 and the member 52 are pressed tightly against the shank and the outer ends of the legs 58 and 60 are preferably connected as by welding at 62, 62 to the remote sides of the jaw 44. It will be noted that the connection described between the control arm and the hanger permits relative movement between the hanger and the control arm only longitudinally of the hanger and that pendulous movements of the hanger are controlled by the control assembly. This type of connection also permits the weight to be carried solely by the hanger. As the hanger wears at its point of pivot, it is permitted to move downwardly with respect to the control arm and is thus prevented from angling diagonally and carrying the load on the control arm, which would have a tendency to misalign the brake rigging carried by the hanger. The connection also permits the hanger and control arm to be assembled without regard to the alignment of the pin-receiving openings in the hanger and the control arm. Welding of the control arm to the hanger is avoided, which prevents burning and weakening the hanger.

I claim:

1. In a brake arrangement, a support, an hanger and control arm arranged side by side and pendulously suspended at one of their ends from said support, resilient means operatively associated with said arm to resist movements thereof, said arm extending at its other end to a point intermediate the ends of the hanger, and means movably connecting said arm and hanger comprising a U-shaped member embracing said hanger and extending at its open end at opposite sides of said other end of said arm, and a weld connection between each end of said member and said arm at said other end thereof.

2. In a brake arrangement, a support, a hanger pendulously suspended therefrom, a control member at one side of the hanger, a resilient connection between one end of said arm and said support, and a connection between the other end of said arm and said hanger intermediate the ends thereof, said connection including a jaw on said arm and a U-shaped clamp oppositely arranged with respect to said jaw, said jaw telescoping into said clamp and embracing said hanger therewith, and a weld connection between each end of said clamp and said jaw.

3. In a brake arrangement, a support, a hanger pendulously suspended therefrom, a control arm at one side of the hanger, means including resilient means pendulously connecting said arm with said support, and means connecting said arm and said hanger intermediate the ends of the hanger, said last-mentioned means extending completely around said hanger and preventing relative movement between the arm and hanger in all directions except longitudinally of the hanger.

4. In a brake arrangement, a hanger comprising a shank with a head at one end, a control arm at one side of the hanger, a jaw at one end of the arm fitted around certain sides of the shank, a U-shaped element fitted around the remaining sides of the shank and telescoped over said jaw and connected thereto, said arm and head having pin openings therethrough alignable transversely of the hanger by relatively shifting the hanger and arm longitudinally of said shank.

5. In a brake arrangement, a brake hanger including a shank, a control arm at one side of the hanger, and a connection between one end of the arm and said shank comprising jaw members connected to each other and enclosing said shank therebetween, said connection being slidable longitudinally of the shank to accommodate adjustment of said arm with respect to said hanger.

6. In a brake arrangement, a support, a hanger pendulously suspended therefrom, control means for resisting movements of the hanger, means yieldingly connecting said control means to the support, and means connecting said control means to the hanger in a manner accommodating movement of the hanger only longitudinally thereof whereby loading of the hanger will not load said control means.

7. In a brake arrangement, a support, a hanger pendulously suspended therefrom, a control arm flexibly connected to said support, and a connection between said hanger and arm comprising a jaw on the arm and a U-shaped clip telescoped over said jaw and integrally united therewith, said clip and jaw extending completely around said hanger and engaging the same.

DAVID M. LIGHT.

REFERENCES CITED

The following references are of record in the file of this patent:

UNITED STATES PATENTS

| Number | Name | Date |
|---|---|---|
| 1,795,237 | Smith | Mar. 3, 1931 |
| 2,018,567 | Page | Oct. 22, 1935 |
| 2,241,479 | Rush | May 13, 1941 |
| 2,246,894 | Celkers | June 24, 1941 |